G. CAEN, Sr.
GASOLENE AND OIL RENOVATOR.
APPLICATION FILED MAR. 30, 1917.
1,248,452. Patented Dec. 4, 1917.
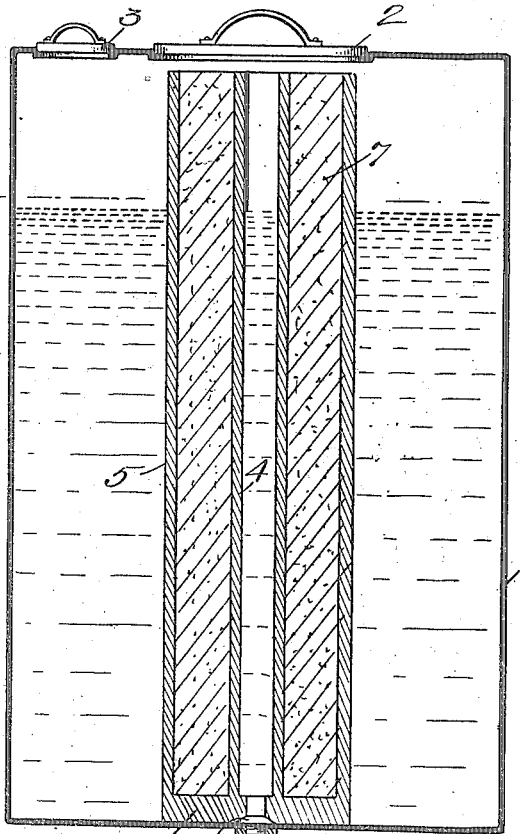
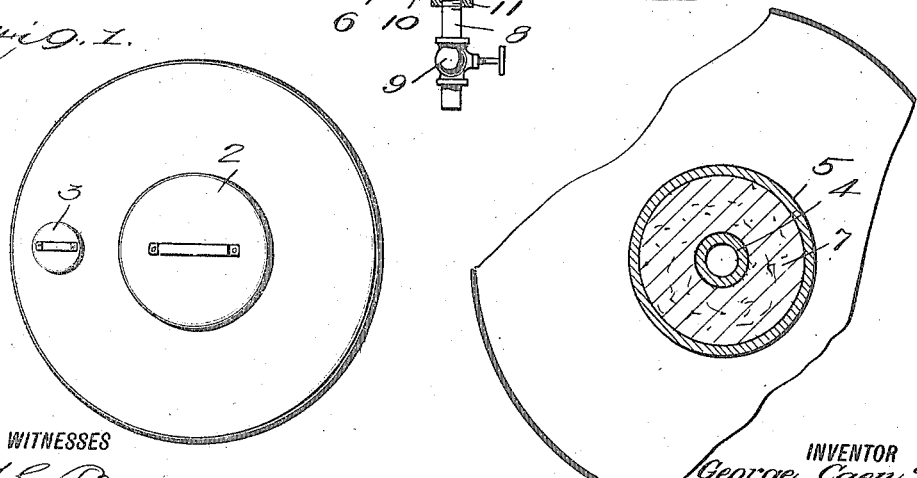
WITNESSES
INVENTOR
George Caen Sr.
BY
ATTORNEYS

UNITED STATES PATENT OFFICE.

GEORGE CAEN, SR., OF SAN ANTONIO, TEXAS.

GASOLENE AND OIL RENOVATOR.

1,248,452. Specification of Letters Patent. Patented Dec. 4, 1917.

Application filed March 30, 1917. Serial No. 158,675.

*To all whom it may concern:*

Be it known that I, GEORGE CAEN, Sr., a citizen of the United States, and a resident of San Antonio, in the county of Bexar and State of Texas, have invented an Improvement in Gasolene and Oil Renovators, of which the following is a specification.

My invention is an improvement in gasolene and oil renovators, and has for its object to provide a device of the character specified, for freeing soiled gasolene, oil and the like from impurities, and putting the said products in condition for reuse.

In the drawings:

Figure 1 is a top plan view of the improved renovator.

Fig. 2 is a vertical section.

Fig. 3 is a partial section taken on the line 3—3 of Fig. 2.

In the present embodiment of the invention a casing 1 is provided of suitable size, the said casing having openings in its top, which are closed by covers 2 and 3, said covers having handles, as shown, for facilitating their removal and replacement. The opening for the cover 2 is central, while that for the cover 3 is eccentric, the latter opening being adapted to receive the oil or gasolene to be renovated.

Within the casing is arranged a filter consisting of concentric inner and outer casings 4 and 5, which are connected at their bottom, as indicated at 6. These cylinders form two chambers, the central cylindrical chamber being adapted to receive the renovated oil or gasolene, while the annular chamber, between the walls 4 and 5, receives a compound, indicated at 7, for purifying the oil or gasolene.

The opening at the cover 2 is of a size to permit the passage of the filter through the said opening. A discharge pipe 8 leads from the central chamber of the filter, and a valve 9 is interposed in said pipe for controlling the same. Through this pipe the purified oil or gasolene may be removed. The pipe 8 has a fixed annular rib 10 which fits within a similarly shaped recess within the bottom 6 of the filter, and a nut 11 is threaded onto the pipe outside of the casing, the nut clamping the bottom of the casing against the rib.

In operation, the oil or gasolene to be renovated is placed within the casing through the opening 3. The oil passes through the wall 5, which is of a porous carbon compound, as is also the wall 4, and through the compound 7 arranged between the walls. The oil or gasolene then passes into the central chamber, from whence it may be withdrawn to be passed to a suitable place of storage, as, for instance, an underground tank.

I claim:

1. A device of the character specified, comprising a casing having openings in its top, and covers for the openings, one of the said openings being central and the other eccentric, and a filter in the casing at the center thereof, said filter comprising concentric inner and outer walls closed at their bottoms and of porous carbon, a filtering compound between the walls, and a valved discharge pipe leading from the space within the inner wall, the central opening of the casing being of a size to permit the removal of the filter.

2. A device of the character specified, comprising a casing, and a filter in the casing, said filter comprising concentric inner and outer walls closed at their bottoms and of porous carbon, a filtering compound between the walls, and a valved discharge pipe leading from the space within the inner wall.

3. A device of the character specified, comprising a filter consisting of concentric inner and outer walls closed at their bottoms and of porous carbon, and a filtering compound between the walls, said filter being adapted to be arranged within a container containing oil or gasolene and having a discharge from the space within the inner wall.

GEORGE CAEN, SR.

Witnesses:
LAURENCE WALLACE,
EARLY NORTHRUP.